Sept. 8, 1925.
E. E. GRAY
1,553,039
CIRCUIT CONTROLLER FOR HEATING ELEMENTS
Filed Oct. 21, 1922
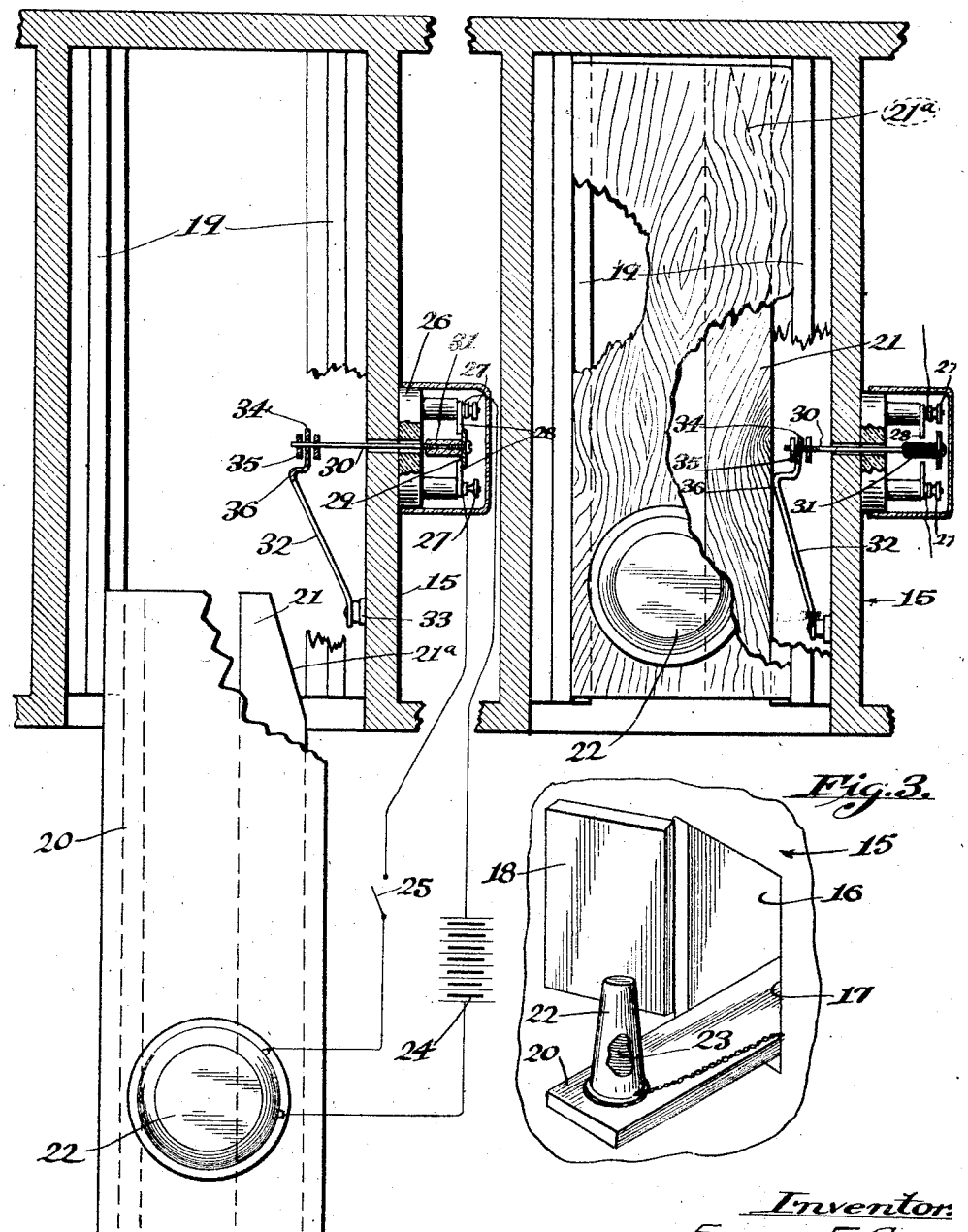
Inventor:
EVERETT E. GRAY
By Hazard & Miller
Attorneys Patented Sept. 8, 1925.

1,553,039

UNITED STATES PATENT OFFICE.

EVERETT E. GRAY, OF LOS ANGELES, CALIFORNIA.

CIRCUIT CONTROLLER FOR HEATING ELEMENTS.

Application filed October 21, 1922. Serial No. 596,000.

*To all whom it may concern:*

Be it known that I, EVERETT E. GRAY, a citizen of the United States, residing at Los Angeles, in the county of Los Angeles and State of California, have invented new and useful Improvements in Circuit Controllers for Heating Elements, of which the following is a specification.

My invention relates to electrical heating elements adapted for use in the heating of spectacle frames, and a purpose of my invention is the provision of a circuit controller for heating elements of this character which operates to open or close the circuit for the heating element according as the latter is moved into or out of a predetermined position.

It is also a purpose of my invention to provide a circuit controller which is particularly adapted for use in conjunction with a movable supporting member for an electrical heating element and in such manner that when the supporting member is withdrawn from the cabinet to expose the heating element, the circuit for the heating element will be closed. Conversely when the supporting member is moved into the cabinet into housing position with respect to the heating element, the circuit controller disrupts the circuit for the heating element thereby preventing the unintentional supply of current to the heating element.

Although I will describe only one form of circuit controller embodying my invention, it is understood that various changes and modifications may be made herein without departing from the spirit of the invention and the spirit and scope of the appended claims.

In the accompanying drawings,

Figure 1 is a view showing in horizontal section a cabinet having applied thereto a movable supporting member for a heating element and one form of circuit controller, each embodying my invention.

Figure 2 is a view similar to Figure 1 with the supporting member in withdrawn position with respect to the cabinet.

Figure 3 is a fragmentary perspective view of the cabinet showing the supporting member in partly withdrawn position.

Referring specifically to the drawings in which similar reference characters refer to similar parts, my invention in its present embodiment includes a cabinet 15 constructed to provide a compartment 16 to which entrance is to be had through the medium of an opening 17 controlled by a door 18. The compartment 16 is provided with guiding ledges 19 upon which a movable supporting member 20 is adapted to slide to occupy the position shown in Figure 1 or the extended position shown in Figure 2. This supporting member 20 includes elements 21 secured to the under side of the member and cooperating with the ledges 19 and properly supporting the member for sliding movement.

Secured to the member 20 adjacent its outer end is a standard form of electrical heating element 22 for use in the heating of spectacle frames made of celluloid or similar material. This heating element 22 is of standard form and includes a casing having a resistance wire 23 therein to which current is adapted to be supplied for heating the casing upon which the spectacle frames are supported. This heating element is provided with a circuit including a suitable source of current such as a battery 24 and a service switch 25. Also included in this circuit is a circuit controller comprising a switch and means for actuating the switch by movement of the supporting member 20.

The switch is shown as sustained upon one side of the cabinet, and includes a base 26 of insulating material upon which are supported binding posts 27 carrying stationary contacts 28. A movable contact 29 is arranged to bridge the contacts 28, and this movable contact is mounted to engage or disengage the stationary contacts by means of a rod 30. The rod 30 is connected to the stationary contacts through an insulating connector 31, and this rod is movable through the base 26 and through the adjacent side of the cabinet 15 where its opposite end is connected to a resilient arm 32. The arm 32 is formed of any suitable spring metal and is secured at one end to a bracket 33, its opposite end being provided with an eye or hook 34 which surrounds the rod 30 between nuts 35. This arm 32 is bent adjacent that end which is connected to the rod 30 to provide a shoulder or projection 36 which in the normal position of the arm is disposed in the path of movement of one of the members 21 so as to be engaged by the beveled surface 21ª of such member to force the arm from its normal position to that shown in Figure 1.

In the operation of the invention, the supporting member 20 normally occupies the position shown in Figure 1 in which it will be seen that the heating element 22 is disposed wholly within the compartment of the cabinet so that the door 18 may be closed. In this position of the supporting member, the arm 32 is flexed in the direction of the switch so that the movable contact 29 occupies disengaging position in respect to the contacts 28 thereby disrupting the circuit for the resistance wire 23 of the heating element. When it is desired to use the heating element 22, the supporting member 20 is partly withdrawn from the cabinet until the straight edge of the member 21 is moved out of contact with the arm 32 thereby allowing the arm to return to normal position and thus move the contact 29 into engagement with the contact 28. This naturally completes the circuit for the resistance wire 23 so that the heating element is now in operation.

By virtue of the beveled edge 21ª of the member 21, it will be clear that the supporting member 20 can be pushed inwardly for a short distance from its outermost extreme position without engaging the projection 36 so that the contact 29 remains in closed position to maintain the heating element in operation. This allows of the required adjustment of the heating element without disrupting its circuit. However, when the supporting member 20 is pushed inwardly beyond that point so that the member 21 engages the projection 36 to flex the arm 32, the contact 29 disengages the contacts 28 to disrupt the circuit for the heating element. It will, therefore, be seen that it is not necessary to move the supporting member 20 into its innermost position in order to disrupt the circuit for the heating element, but that when the supporting member is in its innermost position the disrupting of the circuit will be assured so that the heating element is no longer in operation.

From the foregoing operation it will be manifest that I have provided a circuit controller which includes a supporting means for a heating element adjustable to open or close the circuit controller according as the heating element occupies a projected or retracted position with respect to the cabinet. Furthermore, the cooperation of the supporting member with the circuit controller is such that an adjustment of the supporting member with the heating element in projected position can be effected without disrupting the circuit for the heating element.

What I claim is:

1. In combination, a movable supporting member, a heating element carried by the member, a circuit controller for the heating element including a switch, and a resilient arm normally closing the switch and disposed in the path of movement of said element whereby said switch is opened when the arm is flexed by engagement with said element.

2. In combination, a movable supporting member, an element secured to the member and having a beveled end, a heating element carried by the member, a switch for controlling the circuit of the heating element, and a spring arm normally closing the switch and disposed in the path of movement of the element secured to the member so as to be engaged by the latter for flexing the arm to open the switch, the beveled end of said arm effecting a gradual movement of the arm for the purpose described.

3. A device of the class described comprising a cabinet, a member slidable within said cabinet adapted to be withdrawn therefrom, an electric heating element carried by said member, a pair of contacts mounted upon said cabinet and electrically connected in a circuit including said heating element, a spring arm disposed within said cabinet, and a rod carrying a bridging contact piece adapted to bridge the space between said contacts actuated by said spring arm, whereby when said member is withdrawn from said cabinet, the circuit through said heating element will be closed and when said member is disposed within said cabinet the circuit through said heating element will be broken.

4. A device of the class described comprising a cabinet, a member slidable within said cabinet adapted to be withdrawn therefrom, an electric heating element carried by said member, a spring arm mounted within said cabinet adapted to be engaged by said member, a rod actuated by said spring arm, and means associated with said rod to open and close the circuit through said heating element when said member is within said cabinet and withdrawn therefrom respectively, said spring arm being so arranged as to normally urge the circuit to be closed.

In testimony whereof I have signed my name to this specification.

EVERETT E. GRAY.